United States Patent [19]

Hassall, Jr.

[11] 4,389,506
[45] Jun. 21, 1983

[54] POLYVINYL ALCOHOL DUST SUPPRESSION BY ADMIXING POLYGLYCOL

[75] Inventor: Thomas Hassall, Jr., Wilmington, Del.

[73] Assignee: E. I. Du Pont de Nemours and Company, Wilmington, Del.

[21] Appl. No.: 276,668

[22] Filed: Jun. 29, 1981

[51] Int. Cl.³ .......................... C08F 6/00; C08K 5/06
[52] U.S. Cl. .................................... 524/377; 524/127; 524/369; 525/58; 525/62; 528/494
[58] Field of Search ..................... 260/33.2 R; 525/58, 525/62; 528/494; 524/377

[56] References Cited

U.S. PATENT DOCUMENTS

| | | | |
|---|---|---|---|
| 3,173,807 | 3/1965 | Marotta et al. | 127/32 |
| 3,422,049 | 1/1969 | McClain | 528/494 |
| 3,432,483 | 3/1969 | Peoples et al. | 528/494 |
| 3,746,681 | 7/1973 | McClain | 528/494 |
| 3,779,785 | 12/1973 | Stiles et al. | 117/4 |
| 3,838,064 | 9/1974 | Vogt et al. | 252/384 |
| 3,932,322 | 1/1976 | Duchane | 260/17.4 |
| 3,972,865 | 8/1976 | McClain et al. | 525/62 |
| 4,027,079 | 5/1977 | McClain et al. | 525/62 |
| 4,100,335 | 7/1978 | McClain et al. | 525/62 |
| 4,108,780 | 8/1978 | Thomas | 252/8.6 |
| 4,119,604 | 10/1978 | Wysong | 260/33.2 |
| 4,136,050 | 1/1979 | Brehm | 252/88 |
| 4,206,101 | 6/1980 | Wysong | 260/23 R |

Primary Examiner—Stanford M. Levin

[57] ABSTRACT

A process for the preparation of a substantially dust-free PVA powder comprising contacting the PVA with about 0.5 percent to 4.0 percent polyglycol, preferably about 0.5 percent to 2.0 percent polyglycol, based on the weight of the PVA, and the product therefrom.

5 Claims, 1 Drawing Figure

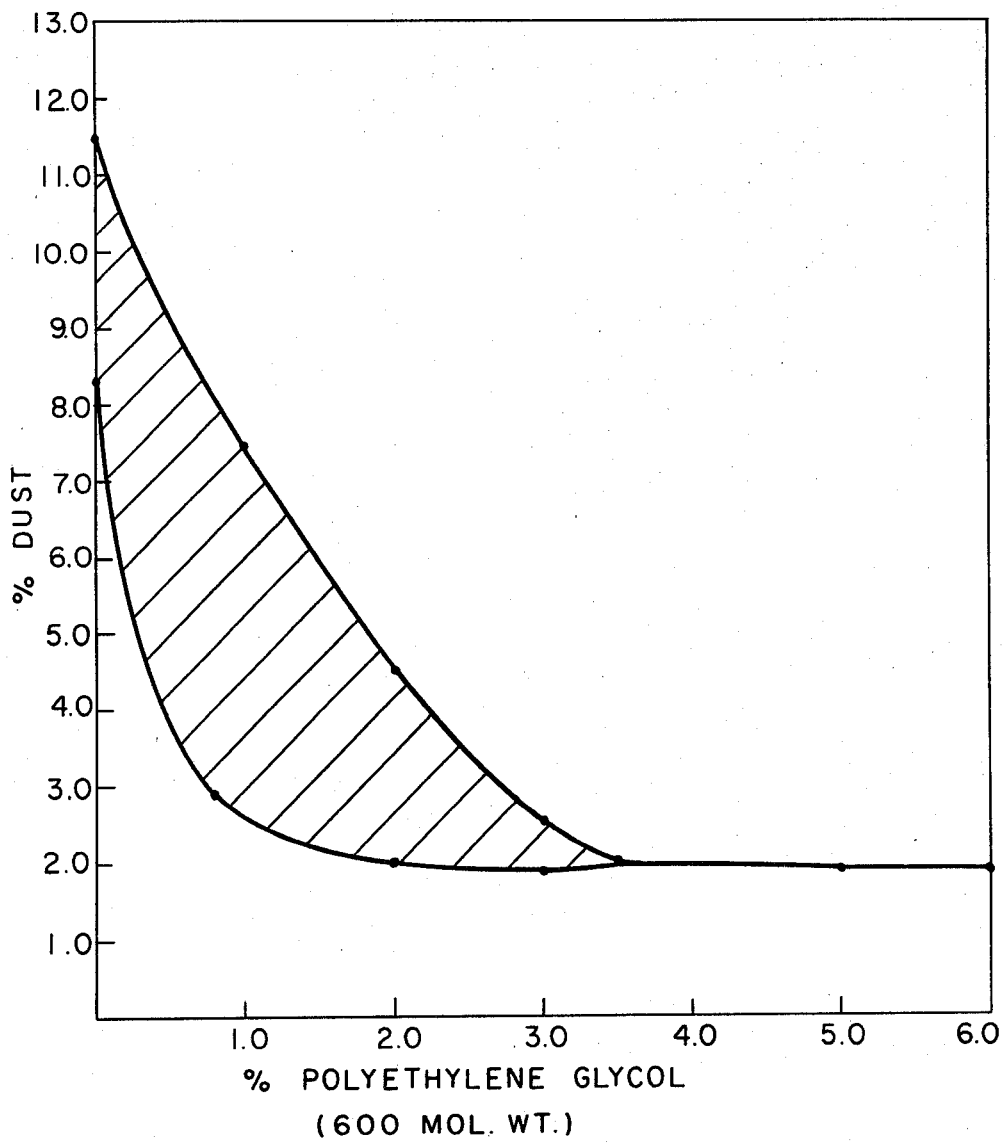

POLYVINYL ALCOHOL DUST SUPPRESSION BY ADMIXING POLYGLYCOL

BACKGROUND OF THE INVENTION

The subject invention relates to the suppression of dustiness inherent in certain polyvinyl alcohols, hereinafter PVA, by contacting the PVA with a low concentration of a water soluble polyglycol.

Various methods for controlling dust in a normally high dusting material are known. For example, it is known to mix a high dusting powder such as antimony oxide with less than about 1 percent by weight polytetrafluoroethylene to form a dry, dust-free mixture. Further, a method for controlling the dustiness of water-insoluble alkali metal carboxylate salts is known whereby the salts are intermixed with fumed silica or fumed alumina particles.

The preparation of a substantially dustless powdered composition of spray-dried acrylic resin is known whereby a dedusting amount of one or more organic alcohols selected from the group consisting of 2-hexadecyl alcohol and iso-tridecanol, is added. Also known is a process for the reduction of dissemination of fugitive dust particles into the atmosphere by treating the particles with an aqueous solution of octylphenoxy polyethoxy ethanol and a copolymer of ethylene oxide and propylene oxide. A satisfactory process for dedusting PVA has yet to be disclosed.

SUMMARY OF THE INVENTION

The subject invention is a process for the preparation of a substantially dust-free PVA powder comprising contacting the PVA with about 0.5 percent to about 4.0 percent polyglycol and the product therefrom. All percentages reported herein, unless otherwise specified, are weight percentages.

BRIEF DESCRIPTION OF THE DRAWING

The FIGURE is a graphical representation of the effect of polyglycol concentrations on the dustiness of PVA.

DETAILED DESCRIPTION OF THE PREFERRED EMBODIMENT

The PVA to be treated by the process of the subject invention has a viscosity of 2 to 125 mPa.s as measured on a 4 percent aqueous solution at 20° C. by the Hoeppler falling ball method (ASTM-D 1343-56) and a degree of hydrolysis or alcoholysis of at least 80 mole percent, including its copolymers. For a more detailed discussion of PVA, see U.S. Pat. No. 4,119,604 assigned to E. I. du Pont de Nemours and Company, herein incorporated by reference.

The dustiness of PVA is caused by fine particles formed when dissolved polyvinyl acetate is hydrolyzed or alcoholyzed to PVA or when the PVA is attrited to granular form. The advantages for certain high fines polyvinyl alcohol in relation to water slurrying and solvation properties are well established; however, inherent in high fines PVA is a dustiness resulting in worker unpleasantness. Attempts made in the past to mix various additives with polyvinyl alcohol to improve end use performance have met with difficulty due to the limited compatibility of PVA with most additives. This incompatibility is typically exemplified by the loss of aqueous solution or film clarity, film-forming ability, and tensile strength. It is the object of this invention to reduce the dustiness of PVA while retaining the advantageous water solubility properties of the small particle size (high fines) product and to accomplish this with no detrimental modifications to the physical film or solution properties of the original polyvinyl alcohol. The subject invention agglomerates these fines during or after PVA production by adding a polyglycol to the PVA production stream. The polyglycol can be used either as a solid, dissolved or dispersed in a fluid, or as a liquid. By agglomerating the small PVA fines, the overall particle size distribution is shifted toward the larger and heavier particle size fractions, thereby reducing the quantity of fines which may remain suspended in the atmosphere during handling, hence increasing the overall PVA yield. This mixing of the PVA and polyglycol can be carried out in any conventional manner, for example, blade mixing, fluidized bed mixing, mill mixing or solvent system mixing, as long as the mixing results in intimate contact between the polyglycol and the PVA.

The dedusting additive, polyglycol, is defined as polyethylene glycol or methoxypolyethylene glycol having a molecular weight of about 200 to 14,000 and an oxyethylene content of 3 to 400 moles with the polyethylene glycol having the general formula $HOCH_2(CH_2OCH_2)_nCH_2OH$. The preferred polyglycol is a polyethylene glycol having a molecular weight of about 600 due to its superior dust suppressant properties after extreme temperature recycling. Block copolymers containing the constituents of polyethylene glycol with propylene oxide in which the oxyethylene content predominates (more than 50 percent) are, to lesser extent, suitable as long as the end-use properties of the PVA are not adversely affected. The molecular weight of these copolymers ranges from about 1000 to 14,000.

The physical nature of polyglycols makes them especially suited to act as a dust suppressant for PVA. The ready cold water solubility of polyglycols allows the agglomerated fines to retain PVA water solubility. The polyglycols do not reduce the tensile strength of films traditionally produced from PVA. Further, although the polyglycols remain on the surface of the PVA particles, they do not introduce deleterious surfactant activity into end uses for PVA. Surprisingly, as exemplified below, other compounds generally grouped with polyglycol as plasticizer additives for PVA including glycerin, water, diethylene glycol and dibutyl phosphate are found to be relatively ineffective as dust suppressants for PVA.

The dustiness of PVA is determined by either of two tests. In the first test, an amount of PVA/polyglycol mixture is added to a cylindrical glass jar so that the jar is about half-filled. After tightly covering the jar, the sample is inverted and immediately returned to its upright position. The amount of time necessary for the PVA fines to settle out of the upper half of the jar, i.e., suspension time, is measured in seconds. For purposes of the subject invention, a dust-free PVA is achieved when the suspension time is 3 seconds or less. In contrast, the second test determines the weight percent of free dust fines of PVA that can be eluted from a 150 gram PVA samples with $4.7 \times 10^{-4}$ m$^3$/s (1 cfm) of air in 5 minutes. For purposes of the subject invention, a 50 percent reduction in percent dust is desired in order to impart a noticeable improvement at manufacturing scales. Both tests are more fully explained in the examples that follow. This dedusting is achieved by contacting about 0.5 to 4.0 percent polyglycol and, more preferably, about 0.5 to 2.0 percent polyglycol with the PVA. These ranges were derived according to the procedure of Example IV, fully explained therein. The contacting is carried out at a temperature where the polyglycol is in a liquid state but not so high that the PVA is subject to degradation, i.e., a range of about −15° C. to 150° C. The contact time that is necessary to achieve a homogeneous mix between the polyglycol and PVA is that time sufficient to achieve at least 50 percent reduction in dust, generally at least 5 minutes.

EXAMPLE I

Various polyglycol dust suppression additives were added to PVA (Elvanol ® 71-30, a fully hydrolyzed PVA containing 100 percent polyvinyl alcohol units manufactured by E. I. du Pont de Nemours and Company and Gelvatol ® 20-30 sold by Monsanto Chemical Co., an 86-89 percent hydrolyzed PVA) to agglomerate the PVA fines. All samples were prepared by heating the granular PVA to a temperature above the melting point of the additive (about 65° C.) in a Readco Sigma Blade mixer, manufactured by Read Co., York, Pa., and then allowing the additive to mix with the PVA for about 30 minutes to obtain homogeneity. The degree of dustiness of the mixture was determined by placing a 150 gm sample in a $9.46 \times 10^{-4}$ m$^3$ (1 quart) cylindrical jar and inverting the jar with the suspension time of the fines measured in seconds. The suspension time for virgin PVA was measured as a control. The results are tabulated below.

| COMPOSITION (% additive based on weight of PVA) | SUSPENSION TIME |
|---|---|
| A. Virgin PVA | 6 seconds |
| B. PVA + 1.0% Pluronic ® F98, manufactured by BASF Wyandotte, Parsippany, NJ, and comprised of ethylene oxide/propylene oxide copolymer containing 80% ethylene oxide units. | 2 seconds |
| C. PVA + 0.5% Carbowax ® 6000 manufactured by Union Carbide, NY, NY, and comprised of repeating oxyethylene units terminated by a hydroxyl group. | 2 seconds |
| D. PVA + 0.5% Carbowax ® 600 also manufactured by Union Carbide, structurally identical to Carbowax 6000. | 2 seconds |
| E. 86-89% hydrolyzed PVA (Gelvatol ® 20-30 Monsanto) attrited to a suspension time of 4 seconds + 0.5% Carbowax 600. | 2 seconds |

EXAMPLE II

This example is to illustrate that a polyglycol with a molecular weight of about 600 is preferred due to its retention of dust suppression properties after extreme temperature cyling.

PVA (Elvanol ®71-30, E. I. du Pont de Nemours and Company) was admixed in a sealed jar with polyglycols having the molecular weights listed below. After 20 minutes mixing on a roll mill, the samples were exposed to a temperature of 90° C. for 1 hour and subsequently at −7° C. for 4 hours. Suspension times were measured at ambient temperatures.

| COMPOSITION (% polyethylene glycol, PEG, based on weight of PVA) | Molecular Wt of PEG | Suspension Time After 1 Hour at 90° C. | Suspension Time After 4 Hours at −7° C. |
|---|---|---|---|
| PVA + 0.5% PEG | 600 | 2 seconds | 2 seconds |
| PVA + 0.5% PEG | 1000 | 2 seconds | 3 seconds |
| PVA + 0.5% PEG | 2000 | 2 seconds | 3 seconds |
| PVA + 0.5% PEG | 4000 | 2 seconds | 3 seconds |
| PVA + 0.5% PEG | 6000 | 2 seconds | 3 seconds |
| PVA + 0.5% PEG | 8000 | 2 seconds | 3 seconds |
| PVA + 1.0% PEG | 600 | 2 seconds | 2 seconds |
| PVA + 1.0% PEG | 6000 | 2 seconds | 3 seconds |

EXAMPLE III

This example is to illustrate that compounds generally grouped with polyglycol as plasticizer additives for PVA are ineffective as dust suppressing additives for PVA. Also included is quantitative data to show that polyglycol with a molecular weight of 600 is preferred over a polyglycol with a molecular weight of 6000.

Several 150 gram samples of PVA (Elvanol ® 71-30, E. I. du Pont de Nemours and Company) were prepared by admixing the various additives listed below for about 20 minutes on a roll mill and tested for dustiness. A control sample of PVA was also tested.

The dustiness of the samples was determined quantitatively as the weight percent of free dust fines of PVA that could be eluted from the PVA with $4.7 \times 10^{-4}$ m$^3$/s (1.0 cfm) of air in 5 minutes using an open "ACE" B (70-100 micron) porosity fritted funnel as the sample receptacle. The results are tabulated below.

| Additive | Percent Dust |
|---|---|
| None | 8.3 |
| 2.0% polyethylene glycol with mol wt of 600 as per the subject invention | 2.0 |
| 2.0% polyethylene glycol with mol wt of 6000 as per the subject invention | 3.2 |
| 2.0% glycerin | 6.7 |
| 2.0% diethylene glycol | 6.2 |
| 2.0% dibutyl phosphate | 5.2 |
| 2.0% alkyl aryl polyether alcohol | 5.1 |

EXAMPLE IV

This example is to illustrate that the addition of less than about 0.5 percent polyglycol does not adequately eliminate the dust from PVA, and that the addition of greater than about 4.0 percent polyglycol to PVA does not increase the dedusting of the PVA.

The same procedure used in Example III was used here. Two samples of PVA were used, Sample A registering 8.3 percent dust in accordance with the procedure of Example III before polyglycol treatment, and Sample B registering 11.5 percent dust. These samples were chosen to determine the lower and upper limits of percent polyglycol necessary to suppress the dustiness of PVA. Samples with greater than about 12 percent dust, after addition of more than about 3 percent polyglycol, displayed particle massing and, hence, could not be fluidized, inhibiting handling of the PVA during plant manufacturing processes. The samples were treated with increasing amounts of polyethylene glycol, molecular weight 600. The results, tabulated below and graphically illustrated in the FIGURE, show that less than about 0.5 percent polyglycol did not adequately eliminate the dust from the PVA, i.e., did not eliminate 50 percent of the dust. Further, the largest quantity of polyglycol needed to completely suppress the dustiness of a PVA sample was evidenced by Sample B which registered 11.5 percent dust before polyglycol treatment. In that case, between 3 and 4 percent polyglycol was added before the PVA lost fluidity completely. The shaded area of the FIGURE, therefore, serves to define the lower and upper limits of the percent polyglycol necessary in the practice of the subject invention, i.e., 0.5 to 4.0 percent based on the weight of the PVA.

Sample A represents a fines content in PVA most commonly found commercially. As seen by reference to the FIGURE, greater than about 2.0 percent polyglycol does not further decrease the percent dust in the PVA. Therefore, a preferred amount of polyglycol required to eliminate dust in such a PVA is 0.5 to 2.0 percent.

| Sample A | |
|---|---|
| Percent polyethylene glycol (600 mole wt) | Percent Dust |
| 0.0 | 8.3 |
| 0.8 | 2.9 |
| 2.0 | 2.0 |
| 3.0 | 1.9 |
| 5.0 | 1.9 |
| 6.0 | 1.9 |

| Sample B | |
|---|---|
| 0.0 | 11.5 |
| 1.0 | 7.5 |
| 2.0 | 4.5 |
| 3.0 | 2.5 |
| 3.5 | 2.0 (loss of fluidity) |

EXAMPLE V

This example is to illustrate that polyglycol does not adversely affect the end-use properties of PVA when cast into film form from aqueous solution, while other compounds generally grouped with polyglycol as plasticizer additives for PVA reduce the tensile strength of such a film.

Aqueous solutions of PVA (Elvanol ® 71-30, E. I. du Pont de Nemours and Company) containing the various additives listed below were cast from aqueous solutions onto a glass plate, air dried 24 hours and conditioned for 48 hours at 21° C. and 50 percent relative humidity prior to Instron testing.

The breaking tensile strength was determined according to the following procedure: a 2.5 cm wide by 2.2 mil thick sample was pulled by the jaws on an Instron tester at a rate of 5 cm/min with an initial jaw separation of 2.5 cm. The tensile strength registered at break was averaged for 5 samples. The tensile strength of film produced from untreated PVA is $77 \times 10^3$ KPa.

The results are tabulated below.

| Additive | Tensile Strength |
|---|---|
| 0.8% polyglycol (mol wt 600) | $77 \times 10^3$ KPa |
| 2.0% polyglycol (mol wt 600) | $77 \times 10^3$ KPa |
| 2.0% glycerin | $70 \times 10^3$ KPa |
| 2.0% diethylene glycol | $70 \times 10^3$ KPa |
| 2.0% dibutyl phosphate | film unobtainable due to loss of wetting properties |

I claim:

1. A process for the preparation of a substantially dustless polyvinyl alcohol powder with a viscosity of 2 to 125 mPa.s and a degree of hydrolysis of at least 80 mole percent comprising contacting the polyvinyl alcohol with about 0.5 to 4.0 weight percent of a dedusting additive selected from the group consisting of polyethylene glycol with a molecular weight (number average) of about 200 to 14,000 and an oxyethylene content of 3 to 400 moles, and methoxypolyethylene glycol with an oxyethylene content of 3 to 400 moles and a molecular weight (number average) of 200 to 14,000, said contacting taking place at a temperature at which the polyglycol is a liquid and at which the PVA is not subject to degradation.

2. The process of claim 1 where the dedusting additive is added to the PVA in a concentration of 0.5 to 2.0 weight percent.

3. The process of claim 1 or claim 2 where the dedusting additive is a polyethylene glycol with a molecular weight (number average) of 600.

4. The product of the process of claim 1 or claim 2.

5. The product of the process of claim 3.

* * * * *